United States Patent [19]
Nussbaum et al.

[11] Patent Number: 5,796,779
[45] Date of Patent: Aug. 18, 1998

[54] ADAPTIVE SIGNAL PROCESSOR FOR NON-STATIONARY ENVIRONMENTS AND METHOD

[75] Inventors: Howard S. Nussbaum; Oleg Brovko; Douglas G. Dewolf, all of Los Angeles, Calif.

[73] Assignee: Raytheon Company, Lexington, Mass.

[21] Appl. No.: 853,545

[22] Filed: May 9, 1997

Related U.S. Application Data

[63] Continuation of Ser. No. 653,753, May 31, 1996, abandoned, which is a continuation of Ser. No. 496,031, Jun. 28, 1995, abandoned, which is a continuation of Ser. No. 285,596, Aug. 3, 1994, abandoned, which is a continuation of Ser. No. 905,939, Jun. 29, 1992, abandoned.

[51] Int. Cl.$^6$ ......................................................... H04B 7/02
[52] U.S. Cl. ...................... 375/267; 375/346; 375/347; 375/349; 455/137
[58] Field of Search ................................. 375/267, 317, 375/346, 347, 349; 455/63, 137, 138, 139, 272, 273, 278.1

[56] References Cited

U.S. PATENT DOCUMENTS

| | | | |
|---|---|---|---|
| 4,850,037 | 7/1989 | Bochmann | 375/100 |
| 5,222,078 | 6/1993 | Cason et al. | 375/76 |

*Primary Examiner*—Don N. Vo
*Attorney, Agent, or Firm*—Leonard A. Alkov; Glenn H. Lenzen, Jr.

[57] ABSTRACT

An adaptive signal processor (100) utilized with a receiving system (10) in a non-stationary environment having a receiver element (12) for receiving a composite signal comprised of a desire input signal and an interference signal. The invention includes a first mechanism (102) for modulating the composite signal to provide a plurality of modulated signals and to generate a plurality of synthetic channels (104). A second mechanism (126) is provided for calculating and applying a plurality of adaptive weight values to the modulated signals in the synthetic channels (104) to provide a plurality of time varying weighted signals. Finally, a third mechanism (128) is provided for combining the time varying weighted signals in the synthetic channels (104) to eliminate the interference signal from the composite signal. In a preferred embodiment, the composite signal is received by an antenna or hydrophone (12) and then digitized and stored in a memory (122). Stored digitized data is then modulated to provide modulated signals and a plurality of synthetic channels (104). Samples of the modulated signals are used as a basis to generate a plurality of adaptive weight values which are applied to the modulated signals to provide time varying weighted signals for tracking the non-stationary environment. The weighted signals are then summed to eliminate the interference signal from the composite signal.

2 Claims, 3 Drawing Sheets

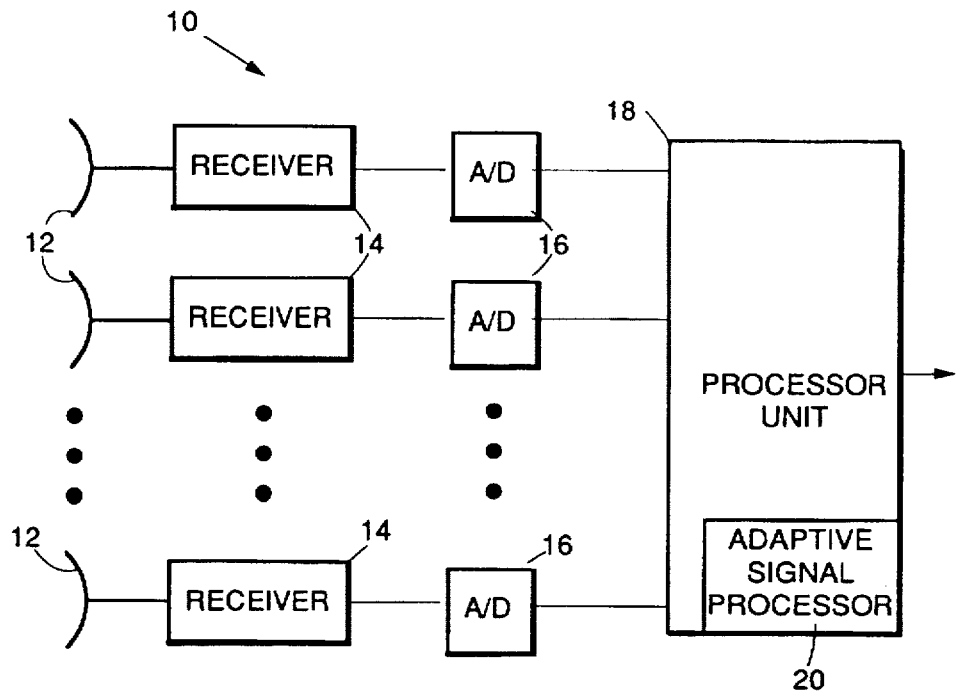
FIG. 1.
( PRIOR ART )
FIG. 2.
( PRIOR ART )
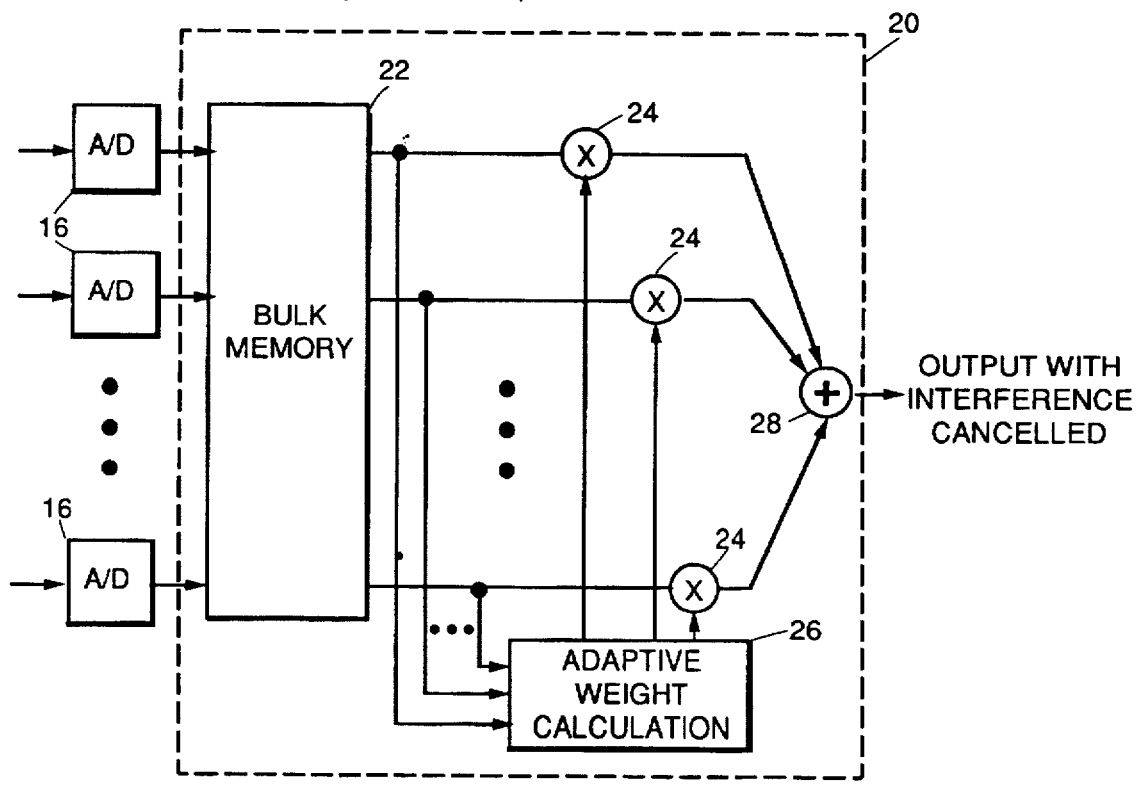

ADAPTIVE SIGNAL PROCESSOR FOR NON-STATIONARY ENVIRONMENTS AND METHOD

This is a continuation application Ser. No. 08/653,753, filed May 31, 1996 which is abandoned, which is a continuation application Ser. No. 08/496,031, filed Jun. 28, 1995 which is abandoned, which is a continuation of application Ser. No. 08/285,596, filed Aug. 3, 1994 which is abandoned, which is a continuation of application Ser. No. 07/905,939 filed Jun. 29, 1992 which is abandoned.

BACKGROUND OF THE INVENTION

1. Field of the Invention

The present invention relates to adaptive signal processors. More specifically, the present invention relates to methods and apparatus for adaptive signal processors for use in non-stationary environments.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Conventional signal receiving systems are susceptible to performance degradation because of the presence of undesirable noise or interference signals in received signals. The suppression of interference signals in the receiving system is very important in order to improve receiver performance (e.g., signal-to-interference ratio). Adaptive signal processors are employed in signal receiving systems utilized in radar, sonar and communication systems for suppressing interference signals. As a result of interference signal suppression, signal-to-interference ratio is often improved.

In general, a signal receiving system includes a device such as an antenna or a hydrophone to receive an analog radio frequency signal. The received analog signal is amplified and operated upon by a receiver element and then digitized prior to being delivered to a processor unit. The processor unit may include an adaptive signal processor between the digitizer and subsequent processing stages. In the adaptive signal processor, for example, weighted combinations of the digitized data are formed to maximize the signal-to-interference ratio. The interference can be jammer, clutter or other undesirable signals. Generally, the digitized data is divided into blocks with each block of data being weighted by an adaptive weight calculation. The adaptive weight calculation is performed on the block of data using sample matrix inversion or known related algorithms within the processor. A new set of adaptive weights is calculated for each data block.

Open-loop adaptive signal processors rely on a single set of data or observations to compute the plurality of adaptive weight coefficients. This is opposed to closed-loop adaptive signal processors in which feedback is required to compute the adaptive weight coefficients. Conventional open-loop adaptive signal processors depend on a constant or stationary environment over the observation period used for adaptation. In many applications, the environment is non-stationary as in the case of amplitude modulations caused by scanning antennas or antenna platform motion. In this case, the digitized data is often divided into small blocks so that the interference properties (e.g., second order statistics) are approximately constant or stationary over individual data blocks. This action is to ensure that the non-stationary environment does not degrade system performance. The weighted digitized data is then summed to form an output signal in which the interference signals have been canceled. The output signal is then further conventionally processed and thereafter used to (a) detect, identify, locate and track a target in a radar or sonar system or (b) extract information from a carrier signal in a communications system.

Calculating the adaptive weights for small blocks of data in this manner presents problems which can degrade interference cancellation performance. The adaptive weights must be calculated for each data block and the accuracy of the adaptive weight estimation is degraded as the block size decreases. Thus, the adaptive weights may become mismatched to the non-stationary environment. Further, the small size of the data blocks and the frequent updates of the adaptive weight values increase the throughput load on the limited capacity adaptive signal processor. Also the adaptive weights which vary discontinuously from block to block degrades other aspects of system performance such as clutter cancellation in radar applications. The adaptive weights distort the data block when the data block exits the adaptive signal processors of the prior art. This situation also causes signal processing problems in subsequent conventional processing stages.

For another reference to adaptive signal processing see, "Introduction to Adaptive Arrays" by Robert A. Monzingo and Thomas W. Miller, published and copyrighted in 1980 by John Wiley and Sons.

Thus, there is a need in the art for improvements in adaptive signal processors for enhancing interference cancellation in non-stationary environments.

SUMMARY OF THE INVENTION

The need in the art is addressed by the adaptive signal processor for non-stationary environments and method of the present invention. The invention is utilized with a receiving system in a non-stationary environment having a receiver element for receiving a composite signal comprised of a desired input signal and an interference signal. The invention includes a first mechanism for modulating the composite signal to provide a plurality of modulated signals and to generate a plurality of synthetic channels. A second mechanism is provided for calculating and applying a plurality of adaptive weight values to the modulated signals in the synthetic channels to provide a plurality of time varying weighted signals. Finally, a third mechanism is provided for combining the time varying weighted signals in the synthetic channels to eliminate the interference signal from the composite signal.

In a preferred embodiment, the composite signal is received by an antenna or hydrophone and then digitized and stored in a memory. Stored digitized data is then modulated to provide modulated signals and a plurality of synthetic channels. Samples of the modulated signals are used as a basis to generate a plurality of adaptive weight values which are applied to the modulated signals to provide time varying weighted signals for tracking the non-stationary environment. The weighted signals are then summed to eliminate the interference signal from the composite signal.

BRIEF DESCRIPTION OF THE DRAWINGS

FIG. 1 is a generalized block diagram of a signal receiving system of the prior art which employs an adaptive signal processor.

3

FIG. 2 is a simplified block diagram of an adaptive signal processor of the prior art suitable for use in the signal receiving system of FIG. 1 and showing a conventional design for adaptive weight calculation.

Figure 3:
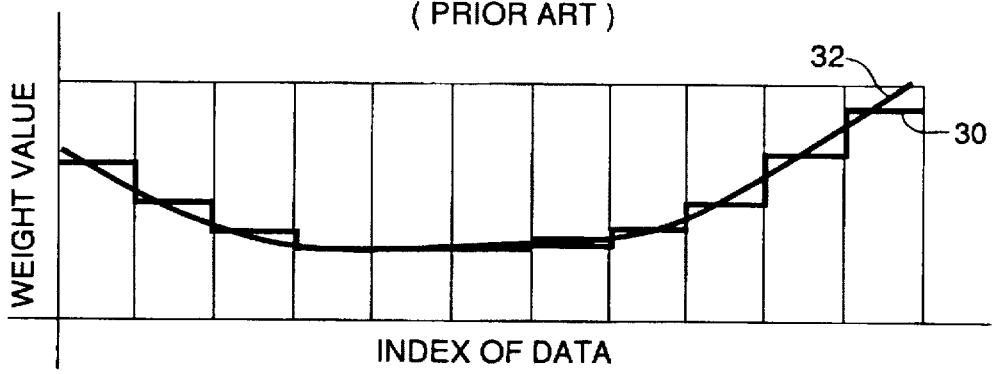

FIG. 3 is a graphical illustration of the adaptive weight value versus the index of data showing weights as calculated by the adaptive signal processor of FIG. 2.

Figure 4:
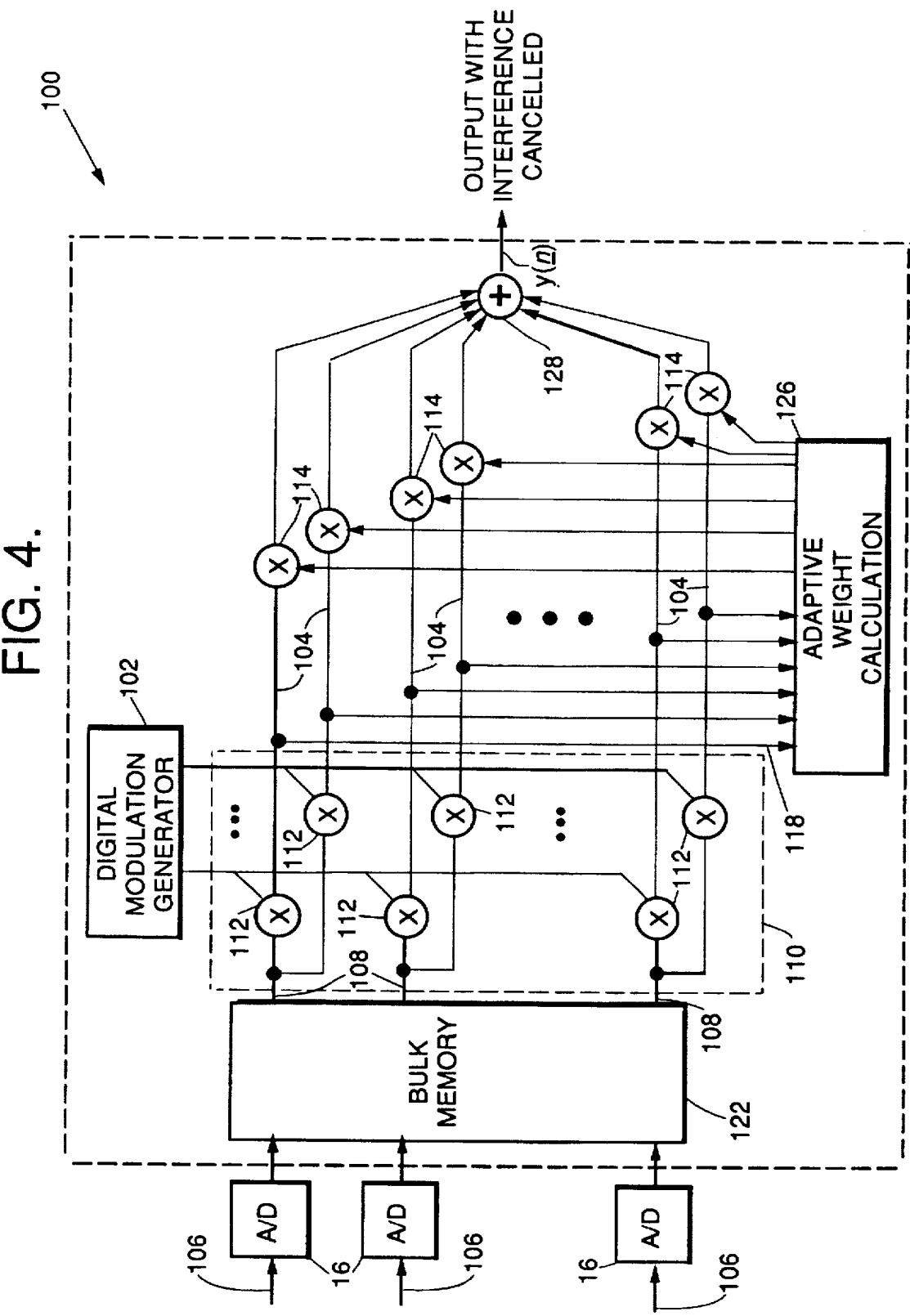

FIG. 4 is a simplified block diagram of the adaptive signal processor for non-stationary environments of the present invention suitable for use in the signal receiving system of FIG. 1 and showing the interjection of digital modulation therein.

Figure 5:
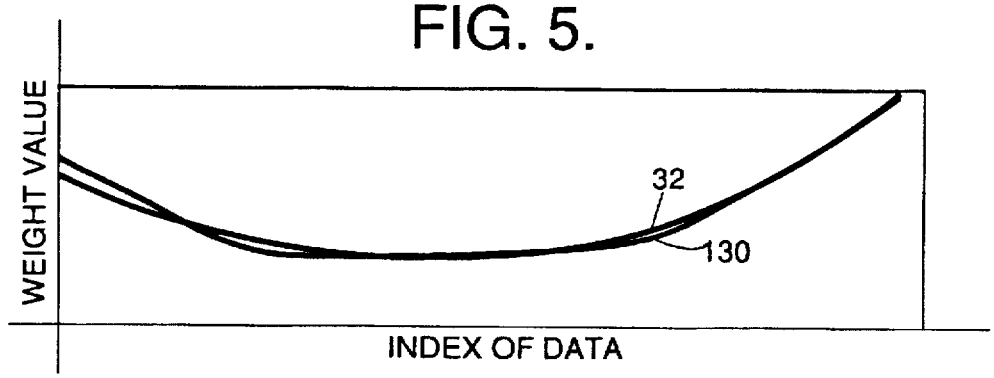

FIG. 5 is a graphical illustration of the adaptive weight value versus the index of data showing the time varying weights as calculated by the adaptive signal processor for non-stationary environments of FIG. 4.

Figure 6:
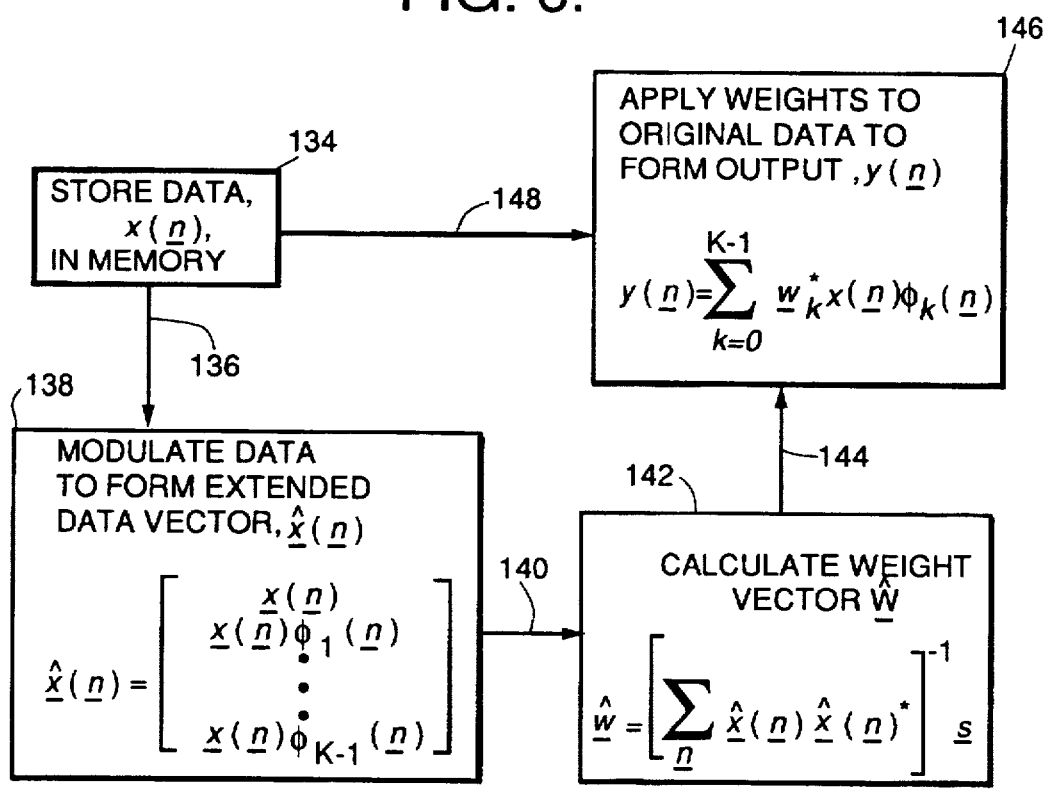

FIG. 6 is a block diagram of the signal processing function of the adaptive signal processor for non-stationary environments of FIG. 4 showing the calculated weight vector being applied to the digital data stored in the bulk memory.

DESCRIPTION OF THE INVENTION

Conventional signal receiving systems are employed in radar, sonar and communication systems for receiving and processing signals. A typical signal receiving system 10 of the prior art is shown in FIG. 1 and includes a plurality of antennas, hydrophones or communication receivers 12 to receive an analog signal. The analog signal is amplified and operated upon by one of a plurality of receiver elements 14 and then digitized by a corresponding analog-to-digital (A/D) converter 16. The A/D converters 16 provide a stream of digital data to a processor unit 18. The signal receiving system 10 is susceptible to performance degradation because of interference signals that enter the receiving system 10 with the analog signal. The analog signal is a composite signal comprising a desired input signal and the interference signals. Therefore, the processor unit 18 includes an adaptive signal processor 20 which is utilized to suppress the interference signals and to improve the desired input signal reception.

The adaptive signal processor 20 of the prior art shown in FIG. 2 includes a bulk memory 22 which receives and stores the stream of digital data from the A/D converters 16. Generally, the adaptive signal processor 20 depends on a stationary environment over the observation period used for adaptation. Therefore, the stored digitized data is divided into small blocks so that the interference properties are approximately stationary over individual data blocks. A plurality of output lines connect the bulk memory 22 to a corresponding plurality of multipliers 24. A small sample of the digital data in the bulk memory 22 is also provided to a box 26 labeled adaptive weight calculation. The examination of the data sample within the calculation box 26 enables the computation of a new set of adaptive weight values for each block of data using sample matrix inversion or related algorithms. The adaptive weight values represent quantities that possess a magnitude and phase that when applied to the digital data enhance interference signal cancellation.

In addition to the stored digital data, each multiplier 24 also receives the adaptive weight values. The adaptive weight values are then applied to each block of digital data, e.g., each block of data from the bulk memory 22 is multiplied by the new set of adaptive weight values to provide a series of weighted digital signals. The weighted digital signals are then fed to a summer 28 which serves to sum the weighted digital signals to provide an adaptive processor output signal. The adaptive processor output signal is a weighted sum of digital signals in which the interference signals have been canceled. Thereafter, the adaptive processor output signal is available to a conventional processing stage (not shown) and used to detect, identify, locate and track a target in a radar or sonar system or extract information from a carrier signal in a communications system.

A graph illustrating the adaptive weight value versus the index of data ( e.g., time or frequency) showing weights as calculated by the adaptive signal processor 20 of the prior art is shown in FIG. 3. The ideal adaptive weight values, which change as a function of time because of the non-stationary environment, are illustrated by the stepped curve 30. An ideal curve 32 of adaptive weight values is also shown in FIG. 3.

Calculating the adaptive weight values for small blocks of data in this manner presents problems which can degrade interference cancellation performance. The adaptive weight values must be calculated for each data block and the accuracy of the adaptive weight estimation is degraded as the block size decreases. Thus, the step representation of the adaptive weights may become mismatched to the non-stationary environment because of the difference between the stepped curve 30 and the ideal curve 32 of FIG. 3. Also, the adaptive weights which vary discontinuously from block-to-block degrades other aspects of system performance such as clutter cancellation in radar applications.

Further, the small size of the data blocks and the frequent updates of the adaptive weight values increase the throughput load on the limited capacity adaptive signal processor 20. Additionally, the discontinuous nature of the adaptive weights shown in FIG. 3 distort the data block when the data block exits the adaptive signal processor 20 of the prior art causing signal processing problems in subsequent conventional processing stages.

The invention is embodied in an adaptive signal processor 100 of the type for use in a non-stationary environment. The adaptive signal processor 100 includes a digital modulation generator 102 and a first plurality of digital multipliers 112 to modulate a received composite signal to provide a plurality of modulated signals and to generate a plurality of synthetic channels 104. The adaptive signal processor 100 also includes an adaptive weight calculator shown as an adaptive weight calculation box 126 in FIG. 4 to calculate and apply a plurality of adaptive weight values to the modulated signals to form a plurality of time varying weighted signals.

Generally, the plurality of modulated signals provided by the digital multipliers 112 and the increased number of synthetic channels 104 cooperate with the adaptive weight calculation box 126 to increase the number of adaptive weight values applied to the modulated signals and to increase the number of time varying weighted signals combined in a summer 128 to eliminate the interference signal from the composite signal in the non-stationary environment.

The plurality of analog-to-digital (A/D) converters 16 receive the composite signal on lines 106 as shown in FIG. 4. The number of A/D converters 16 utilized with the adaptive signal processor 100 is dependent upon the number of antennas, hydrophones or communication receivers 12 employed. The A/D converters 16 transform the composite signal from analog to digital form and the resultant stream of digital data is stored in a bulk memory 122 located within the adaptive signal processor 100. The stream of digital data includes the digital equivalent of the desired input signal and the interference signal. The function of the bulk memory 122 is to store the digital data and to divide the stored data into blocks suitable for processing. The size of the blocks of the digital data is larger in the present invention compared to the data blocks of adaptive signal processors of the prior art as will be explained herein below. The number of output terminals 108 of the bulk memory 122 is determined by the intended application.

The blocks of digital data are transferred from the bulk memory 122 to a modulation section 110 via the output terminals 108 as shown in FIG. 4. The modulation section 110 is divided into two subsections. The first subsection comprises the digital modulation generator 102 which generates a modulation function or signal and can be, for example, a signal generator. The second subsection of the modulation section 110 comprises the first plurality of digital multipliers 112. The digital multipliers 112 receive and apply the modulation function or signal generated by the digital modulation generator 102 to the blocks of digital data. Thus, the actual modulation of the digital data occurs in the digital multipliers 112. The modulation function or signal developed by the digital modulation generator 102 is a sample version of an analog signal, e.g., a digital sample. Thus, the modulation function or signal can be a sample version of, for example, a sinusoid, a complex sinusoid, a polynomial, an orthogonal polynomial, a multidimensional polynomial or a general seperable multidimensional polynomial. By way of example but not by way of limitation, specific sample modulation functions are set out in equations [8] through [13] hereinbelow.

In operation, the blocks of data are initially operated on by the first plurality of digital multipliers 112 which are known in the art. The output terminals 108 of the bulk memory 122 serve as the input channels to the digital multipliers 112. The digital multipliers 112 of the modulation section 110 receive the modulation function or signal from the digital modulation generator 102 and then perform the digital modulation on the blocks of digital data. The digital multipliers 112 combine the data in a prescribed sequence determined by the modulation function. Each of the input channels to the digital multipliers 112 is multiplied by one term of the modulation function.

The modulation function is selected to counteract the non-stationary environment that exists such as modulation of the original composite signal caused by scanning the antenna 12 shown in FIG. 1. This is accomplished by selecting the modulation function in a manner which enables the non-stationary environment to be matched by a linear combination of the modulated signals. By choosing the appropriate digital modulation function, the plurality of synthetic channels 104 are created which enable the non-stationary environment to be tracked. Generally, selection of the modulation function for use in the digital modulation generator 102 to counteract the non-stationary environment can be accomplished either by (a) modelling the interference environment, or (b) conducting tests with real data.

In the modelling approach, a computer model of the interference environment is created. The interference environment includes clutter, jamming signals and/or noise. Thereafter, each modulation function is separately incorporated into the digital modulation generator 102 and tested to determine which modulation function most effectively cancels the interference signal. In the testing approach, each modulation function is also separately incorporated into the digital modulation generator 102 and tested with real data. The modulation function that provides the most effective interference signal cancellation is selected to counteract the non-stationary environment. An example of real data utilized in the testing procedure includes radar signals received on lines 106 of the A/D converters 16 shown in FIG. 4. The received radar signals are recorded and replicated in the process.

The adaptive signal processor 100 generates the additional synthetic channels 104 from existing blocks of digital data using digitally applied modulation. During the modulation of the digital data, the plurality of synthetic channels 104 are formed by multiplying the synthetic channel time series, for example, by the polynomial modulation "t" or "$t^2$" on the interval for updating the adaptive weight values. Thus, the blocks of digital data from the bulk memory 122 are multiplied in the first plurality of digital multipliers 112 by the modulation function to artifically create the additional synthetic channels 104. Although only two synthetic channels 104 are shown generated for every input channel shown in FIG. 4, it is possible to create a large number of synthetic channels in a particular application. Each synthetic channel 104 includes one of the digital multipliers 112.

The synthetic channels 104 serve to increase the total number of channels, the throughput and complexity of the adaptive signal processor 100. As a direct result, the aggregate number of modulated signals within the synthetic channels 104 to which the adaptive weight values from the adaptive weight calculation box 126 are applied is increased. Thus, the dimensionality of the adaptive signal processor 100 is extended. By extending the dimensionality of the processor 100, the cancellation of the interference signal component of the modulated signal in a non-stationary environment is improved.

The output signals of the digital multipliers 112 form the modulated signals of the synthetic channels 104. The plurality of modulated signals are directed to a corresponding second plurality of digital multipliers 114 via the synthetic channels 104 and to the adaptive weight calculation box 126 via a plurality of sample lines 118 as shown in FIG. 4. The sample lines 118 (for illustration purposes) are shown extending from the synthetic channels 104 to the adaptive weight calculation box 126. A sample of the plurality of modulated signals is supplied to the adaptive weight calculation box 126 for each occurrence of digital data modulation. The examination of the sample of modulated signals within the adaptive weight calculation box 126 enables the computation of a new set of adaptive weight values for each block of digital data using sample matrix inversion or related algorithms. The adaptive weight values provided by the adaptive weight calculation box 126 represent signals having characteristics that enhance interference signal cancellation.

Another illustration of the effects of a non-stationary environment includes sidelobe cancellation with an airborne radar during maneuvers which impart motion to the radar platform. The sidelobe amplitude of the main channel antenna modulates the adaptive signal processor 100 during the maneuvers. However, the broad beamwidth auxiliary channel antennas do not significantly modulate the processor 100. Therefore, a time varying mismatch is created between the signals from the main and auxiliary antennas. Instead of periodically determining the adaptive weight values for many small data blocks from the bulk memory 122, the adaptive weight values of the present invention are determined less frequently for larger blocks of modulated signals. This procedure represents a distinction over the prior art method.

The adaptive weight values calculated by the adaptive weight calculation box 126 are then supplied to the second plurality of digital multipliers 114 shown in FIG. 4. The number of adaptive weight values applied to the digital multipliers 114 is equal to the number of synthetic channels 104. Therefore, the product of the adaptive weight values and the modulated signals provides an equivalent number of time varying weighted signals. The increase in the number of time varying weighted signals is a result of the increase in dimensionality (e.g., generation of additional synthetic channels during digital modulation). In accordance with the previous example of polynomial modulation by "t" or "$t^2$", the net effect of the modulation of the digital data is to synthesize the plurality of time varying weighted signals which assume either a linear or quadratic form. The function of the time varying weighted signals is to track changes in the pattern of the antenna, hydrophone or communication receiver 12. The plurality of time varying weighted signals in each synthetic channel 104 are then combined in the summer 128. The output signal y(n) of the summer 128 is a weighted sum of time varying signals in which the interference signal cancellation performance in a non-stationary environment is improved.

A comparison of FIGS. 3 and 5 will serve to further illustrate the distinctive features of the present invention. In the adaptive signal processor of the prior art illustrated in FIG. 3, the index of data is shown divided into small increments and the adaptive weight values are illustrated by the stepped curve 30. The adaptive weight values of FIG. 3 are selected to approximate the ideal curve 32. This approximation process is accomplished in the adaptive signal processor of the prior art by incrementing the data into small blocks and determining the weight value at a rapid step.

FIG. 5 shows a graphical illustration of the effective adaptive weight values for a channel generated in the present invention. The effective time varying weight values which represent the weighted linear combination of the adaptive weights calculated in box 126 and the modulation functions for a channel are shown plotted against the index of data by the curve 130. The adaptive weight values shown in FIG. 5 smoothly change as a function of time and closely approximate the ideal curve 32. Use of appropriate modulation of the digital data permits the use of larger data blocks. The data need not be partitioned into small blocks to avoid the problems associated with the non-stationary environment. Further, the small discontinuous steps in the curve have been eliminated. It is the increased dimensionality provided by the synthetic channels 104 that enables the curve 130 of the adaptive signal processor 100 to emulate the ideal curve 32.

In some applications, the variations causing the non-stationary environment are in time (t). However, in other environments, the variations can be multidimensional. For example, in radar, the variations can be in range, pulses, Doppler filters or subband filters. To combat these problems, the adaptive weight values are multidimensional functions of time, range, pulse and filter where the functions are provided by a decomposition matched to the problem. The following illustrates a method for determining the adaptive weight values calculated by the adaptive weight calculation box 126. The adaptive weight values w(n) assume the form:

$$\underline{w}(\underline{n}) = \sum_{k=0}^{K-1} \underline{w}_k \phi_k(\underline{n}) \quad [1]$$

where n is an index vector combining time, range, pulse and filter. $\phi_k(n)$ is the $k^{th}$ modulation function, and $w_k$ is the weight vector corresponding to $\phi_k(n)$. Hence, K weight vectors must be computed per block of digital data in the present invention versus one vector per digital data block as taught in the prior art. Thus, larger data blocks are utilized for calculating the adaptive weights at the expense of calculating additional parameters describing the non-stationary environment (e.g., the adaptive weight values corresponding to the synthetic channels derived by modulation). In accordance with the example of polynomial modulation by "t" or "$t^2$", the linear and quadratic modulations enable tracking the non-stationary environment to the second order. A distinct advantage of the present invention is that the data block size can be much greater than K times the data block size required for the adaptive signal processor of the prior art. Thus, fewer adaptive weight values are calculated per unit time by the adaptive weight calculation box 126 of the present invention.

The adaptive weight values are computed by increasing the dimensionality of the processor 100 by the factor K and then utilizing a known approach. For example, let x(n) be the observed digital data stored in the bulk memory 122 and $\hat{x}(n)$ be the extended digital data where $$\hat{\underline{x}}(\underline{n}) = \begin{bmatrix} \underline{x}(\underline{n}) \\ \underline{x}(\underline{n})\phi_1(\underline{n}) \\ \cdot \\ \cdot \\ \underline{x}(\underline{n})\phi_{K-1}(\underline{n}) \end{bmatrix} \quad [2]$$

Thereafter, the adaptive weight values are computed as follows $$\hat{\underline{w}} = \begin{bmatrix} \underline{w}_0 \\ \underline{w}_1 \\ \cdot \\ \cdot \\ \underline{w}_{K-1} \end{bmatrix} \quad [3]$$

In Sample Matrix Inversion form, the adaptive weight values are given by $$\hat{\underline{w}} = \left[ \sum_{\underline{n}} \hat{\underline{x}}(\underline{n})\hat{\underline{x}}(\underline{n})^* \right]^{-1} \underline{s} \quad [4]$$

where s is the signal steering vector. Equation |4| describes the adaptive weight values $\hat{w}$ as the inverse of a matrix consisting of the sum of the product of a plurality of samples of the digital data multiplied by the complex conjugate transpose of the digital data samples with the inverse of the matrix multiplied by the signal steering vector s. The calculation of the adaptive weight values is not limited to the Sample Matrix Inversion algorithm. Other approaches such as the Modified Gram-Schmidt, Givens Rotations or Householder QR decomposition algorithms can also be used. Finally, the output signal y(n) of the adaptive signal processor 100 after application of the adaptive weight values and after summing the time varying weighted signals is given by $$y(\underline{n}) = \sum_{k=0}^{K-1} \underline{w}_k^* \underline{x}(\underline{n})\phi_k(\underline{n}) \quad [5]$$

A block diagram of the signal processing function of the adaptive signal processor 100 is shown in FIG. 6. A first block 134 labeled "store data x(n), in memory" represents the digital data stored in the bulk memory 122. A path 136 represents the transference of the stored data to a second block 138 labeled "modulate data to form extended data vector, $\hat{x}(n)$". The second block 138 which recites equation |2| represents the modulation of the digital data stored in the bulk memory 122 by the digital modulation generator 102 and digital multiplier 112 shown in FIG. 4. The original number of "n" channels is dimensionally extended to "k×n" channels to form the synthetic channels 104.

The extended data vector, $\hat{x}(n)$, is then transferred along a path 140 to a third block 142 labeled "calculate weight vector $\hat{w}$" as shown in FIG. 6. The third block 142 which recites equation |4| represents the calculation of the weight vector $\hat{w}$ by the Sample Matrix Inversion algorithm. The weight vector $\hat{w}$ is then transmitted along a path 144 to a fourth block 146 labeled "apply weights to original data to form output, y(n)". Additionally, the stored data, x(n), in block 134 is transmitted to the fourth block 146 along a path 148. The fourth block 146 which recites equation [5] represents the application of the calculated weight vector $\hat{w}$ to the digital data x(n) stored in the bulk memory 122. The resulting time varying weighted signals are then combined in summer 128 to provide the output signal y(n). The interference component of the composite signal has been eliminated in the output signal y(n).

The following is an illustration of the operation of the present invention. Consider an example in which "n" is the scalar "n" corresponding to time (t) or to pulse number. Let the modulation functions be $$\phi_0(n)=1$$

$$\phi_1(n)=n \qquad |6|$$

$$\phi_2(n)=n^2$$

The adaptive weight values are then of the form $$w(n)=w_0+(w_1 \times n)+(w_2 \times n^2) \qquad |7|$$

Note that the adaptive weight values approximate smoothly varying modulations. With these modulations, the processor 100 estimates a polynomial approximation to the time varying ideal weight values. Thus, only three adaptive weight values are required as shown in equation [7] to estimate the polynomial approximation of the time varying ideal curve 32 shown in FIG. 5.

The invention is not limited to the specific decomposition (e.g., modulation function) of the example. Other possibilities of modulation functions for developing a signal include but are not limited to:

Polynomials: $\phi_k(n)=n^k$ [8]

Orthogonal Polynomials: Legendre, Hermite [9]

Sinusoids: $\phi_{2k}(n)=\cos(w_k n)$, $\phi_{2k+1}(n)=\sin(w_k n)$ [10]

Complex Sinusoids: $\phi_k(n)=e^{iw_k n}$ [11]

Multidimensional Polynomials: $\phi_k(n)=\{n_1^{j_1(k)}\} \times \{n_2^{j_2(k)}\}$ [12]

where $j_1(k)$, $j_2(k)$ relates one dimensional index to multiple parameters, and General Separable Multidimensional: $\phi_k(n)=$
$\zeta_{j_1(k)}^1(n_1) \cdot \zeta_{j_2(k)}^2(n_2) \cdot \zeta_{j_3(k)}^3(n_3)$ [13]

where:

$j_1(k)$, $j_2(k)$ relates one dimensional index to multiple parameters, $$\underline{n} = \begin{bmatrix} n_1 \\ n_2 \\ n_3 \\ \cdot \\ \cdot \\ \cdot \end{bmatrix} \text{ and}$$

$\zeta_k^m(n)$ is the $k^{th}$ modulation function for the $m^{th}$ dimension (index).

The present invention is consistent with applications of the adaptive signal processor 100 requiring subbanding or tapped delay processing to improve interference cancellation and approaches requiring clutter cancellation prior to calculation of the adaptive weights. In general, the present invention is applicable to multichannel radar, sonar and communication systems which use adaptive signal processors. More particularly, the present invention extends applications of adaptive signal processing to (but not limited to) coherent sidelobe cancelers, adaptive beamforming displace phase center antennas (DPCA), slow ground moving target indication (GMTI) devices and adaptive space time processing methods. Further, the present invention can reduce the amount of signal processing required to maintain a given level of interference signal cancellation. This is possible because larger blocks of digital data are utilized to generate the time varying weighted signals. Since larger data blocks are used, less signal processing is required in comparison to the amount of signal processing required for the large number of small data blocks required in the prior art.

The present invention applies digital modulation to blocks of digital data received by an adaptive signal processor located within a signal receiving system positioned in a non-stationary environment. Modulation of the digital data provides modulated signals which increase the dimensionality of the processor by synthesizing additional channels. The modulation functions are selected so that the range of expected non-stationary environments can be closely approximated by linear combinations of the modulated signals. The increased dimensionality increases the number of adaptive weight values applied to the modulated signals which enables a larger number of time varying weighted signals to be combined. The enhanced number of time varying weighted signals serves to provide an adaptive signal processor output signal in which the interference signal component of the composite signal is minimized. Thus, an adaptive signal processor is disclosed that improves interference signal cancellation in a non-stationary environment. Further, clutter cancellation approaches optimal levels in radar applications. It is to be understood that the modulation of the digital data and the calculation of the adaptive weight values is preferably accomplished by computer software.

Thus, the present invention has been described herein with reference to a particular embodiment for a particular application. Those having ordinary skill in the art and access to the present teachings will recognize additional modifications, applications and embodiments within the scope thereof. Although the detailed description of the adaptive signal processor is directed to and finds utility in a digital implementation, the present invention is equally applicable to an analog implementation.

It is therefore intended by the appended claims to cover any and all such modifications, applications and embodiments within the scope of the present invention.

Accordingly,

What is claimed is:

1. In an adaptive signal processor for use with a receiving system on a non-stationary environment having means for receiving a composite signal including a desired input signal and an interference signal, a method for canceling said interference signal including the steps of:

digitizing said composite signal with a plurality of analog-to-digital converters to provide a digitized composite signal;

modelling the interference environment including clutter, jamming signals, and noise, by generating a plurality of modulation functions to enable said non-stationary environment to be matched by a combination of modulated signals;

selecting which of the plurality of modulation functions most effectively cancels the interference signal;

modulating said digitized composite signal using said selected modulation function to provide a plurality of modulated digitized composite signals;

calculating and applying a plurality of adaptive weight values to said plurality of modulated digitized composite signals to provide a plurality of time varying weighted signals; and combining said time varying weighted signals to eliminate said interference signal from said composite signal.

2. The adaptive signal processor of claim 1 wherein each of said plurality of modulation functions is separately incorporated into the digital modulation generation means and tested with real data.

* * * * *